United States Patent
Linjama

(10) Patent No.: US 7,159,326 B2
(45) Date of Patent: Jan. 9, 2007

(54) ELECTRONIC DEVICE, COMPUTER PROGRAM PRODUCT AND METHOD OF OPERATING BUILT-IN COMPASS

(75) Inventor: Jukka Linjama, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/036,406

(22) Filed: Jan. 14, 2005

(65) Prior Publication Data

US 2006/0156565 A1 Jul. 20, 2006

(51) Int. Cl.
*G01C 17/38* (2006.01)

(52) U.S. Cl. ...................................... 33/356
(58) Field of Classification Search ............... 33/356, 33/334, 354
See application file for complete search history.

(56) References Cited

U.S. PATENT DOCUMENTS

| | | | |
|---|---|---|---|
| 2,424,254 A * | 7/1947 | Sawyer ................... | 33/356 |
| 5,761,094 A * | 6/1998 | Olson et al. ............. | 33/356 |
| 6,516,526 B1 * | 2/2003 | Iden ........................ | 33/355 R |
| 6,651,003 B1 * | 11/2003 | Woloszyk et al. ....... | 33/356 |
| 6,877,237 B1 * | 4/2005 | Withanawasam ........ | 33/356 |
| 6,962,001 B1 * | 11/2005 | Yano et al. .............. | 33/355 R |

* cited by examiner

*Primary Examiner*—Christopher W. Fulton
(74) *Attorney, Agent, or Firm*—Hollingsworth & Funk, LLC

(57) ABSTRACT

There is provided an electronic device having a built-in compass, comprising: a processing unit for controlling functions of the electronic device; an input device for giving control commands; an acceleration sensor for measuring tilt angle of the electronic device. The processing unit is configured to set a horizontal condition required for the built-in compass, the horizontal condition indicating admissible values of tilt angle of the electronic device, to detect activation of a navigation application on the basis of the input device, to send a control command to the acceleration sensor for measuring a tilt angle of the electronic device when activation of the navigation application is detected, to compare the measured tilt angle with the horizontal condition for the built-in compass, and to calculate a compass direction when, on the basis of the comparison, it is detected that the electronic device meets the horizontal condition required.

12 Claims, 2 Drawing Sheets

ELECTRONIC DEVICE, COMPUTER PROGRAM PRODUCT AND METHOD OF OPERATING BUILT-IN COMPASS

FIELD

The invention relates to a method of operating a built-in compass of an electronic device, to an electronic device and to a computer program product encoding a computer program of instructions for executing a computer process for operating a built-in compass of an electronic device.

BACKGROUND

Different kinds of navigation and way-finding applications are nowadays used in electronic devices, such as in mobile phones. In order for such applications to operate, the user of a device is required extra care. A challenge is that the device should be positioned relatively accurately in a horizontal direction, i.e. with no tilting of the device, to enable the device to read an electronic compass reliably and to indicate orientation information to the user. Visual attention is also needed for looking at a compass reading and possible display indicators indicating that the device is in horizontal orientation. Thus, for example compass usage requires excessive user attention and cannot easily be carried out in a mobile context, i.e. on the move.

Further, compass/navigation applications must be activated by pressing keys of the device each time compass readings are needed. Usually when the user is on the move, a locking function of the keys/input means is used to prevent the device from functioning when the keys are unintentionally pressed down during transportation or when the user himself/herself accidentally presses the keys. However, it is impossible to use compass/navigation applications while, for example, the keys of the device are locked.

A need exists for user-friendly electronic devices that provide a simple way of navigating. Such devices would be highly useful for orienteers, backpackers and hikers, for example.

BRIEF DESCRIPTION OF THE INVENTION

An object of the invention is to provide an improved method of operating a built-in compass of an electronic device, an improved electronic device and an improved computer program product encoding a computer program of instructions for executing a computer process for operating a built-in compass of an electronic device. According to an aspect of the invention, there is provided a method of operating a built-in compass of an electronic device, the method comprising: setting a horizontal condition required for the built-in compass, the horizontal condition indicating admissible values of tilt angle of the electronic device; detecting activation of a navigation application on the basis of an input device; measuring a tilt angle of the electronic device when activation of the navigation application is detected; comparing the measured tilt angle with the horizontal condition for the built-in compass; and calculating a compass direction when, on the basis of the comparison, it is detected that the electronic device meets the horizontal condition required by the built-in compass.

According to another aspect of the invention, there is provided an electronic device having a built-in compass, the electronic device comprising: a processing unit for controlling functions of the electronic device; an input device coupled to the processing unit for giving control commands; an acceleration sensor coupled to the processing unit for measuring tilt angle of the electronic device. The processing unit is further configured to set a horizontal condition required for the built-in compass, the horizontal condition indicating admissible values of tilt angle of the electronic device, to detect activation of a navigation application on the basis of the input device, to send a control command to the acceleration sensor for measuring a tilt angle of the electronic device when activation of the navigation application is detected, to compare the measured tilt angle with the horizontal condition for the built-in compass, and to calculate a compass direction when, on the basis of the comparison, it is detected that the electronic device meets the horizontal condition required by the built-in compass.

According to another aspect of the invention, there is provided a computer program product encoding a computer program of instructions for executing a computer process for operating a built-in compass of an electronic device, the process comprising: setting a horizontal condition required for the built-in compass, the horizontal condition indicating admissible values of tilt angle of the electronic device; detecting activation of a navigation application on the basis of an input device; measuring a tilt angle of the electronic device when activation of the navigation application is detected; comparing the measured tilt angle with the horizontal condition for the built-in compass; and calculating a compass direction when, on the basis of the comparison, it is detected that the electronic device meets the horizontal condition required by the built-in compass.

According to another aspect of the invention, there is provided an electronic device having a built-in compass, the electronic device comprising: processing means for controlling functions of the electronic device; input means for giving control commands; measuring means for measuring tilt angle of the electronic device; setting means for setting a horizontal condition required for the built-in compass, the horizontal condition indicating admissible values of tilt angle of the electronic device; detection means for detecting activation of a navigation application on the basis of the input means; control means for sending a control command to measuring means for measuring a tilt angle of the electronic device when activation of the navigation application is detected; comparing means for comparing the measured tilt angle with the horizontal condition for the built-in compass; and calculating means for calculating a compass direction when, on the basis of the comparison, it is detected that the electronic device meets the horizontal condition required by the built-in compass.

The invention provides several advantages. An intuitive use of compass applications becomes possible. Problems caused by false readings due to a tilted device when reading a compass are solved. Energy of the devices is saved and thus, longer battery times are achieved. A compass reading can be taken even without paying any visual attention to the device while on the move.

LIST OF DRAWINGS

In the following, the invention will be described in greater detail with reference to the embodiments and the accompanying drawings, in which FIG. 1 shows an example of an electronic device having a built-in compass;

DESCRIPTION OF EMBODIMENTS

Figure 1:
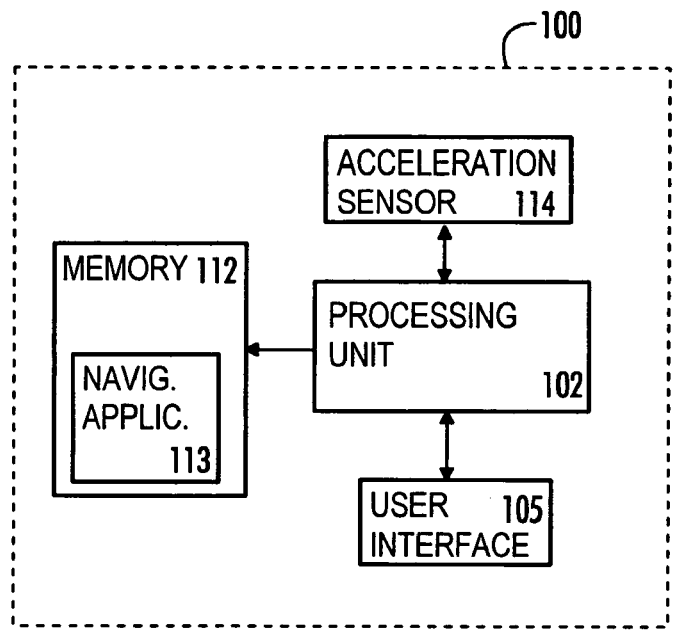

With reference to FIG. 1, examine an example of an electronic device to which embodiments of the invention can be applied. The embodiments of the invention are applicable to communications devices, such as a mobile station used as a terminal in telecommunication systems comprising one or more base stations and terminals communicating with the base stations, for example. The electronic device may be used for short-range communication implemented with a Bluetooth chip, an infrared or a WLAN connection, for example. The electronic device is, for example, a portable telephone or another device, such as a portable computer, a personal computer, a handheld computer or a smart telephone. The electronic device may be a PDA (Personal Digital Assistant) device with or without the necessary communication means for establishing network connections.

FIG. 1 shows a block diagram of a structure of an electronic device 100 having a built-in compass. A processing unit 102, typically implemented by means of a microprocessor and software or separate components, controls the basic functions of the electronic device. A user interface 105 of the electronic device 100 may comprise an input device and a display. The display may even be the only user interface 105 provided in the device for enabling the operation of the device to be controlled. In addition, the user interface of the communications device may include a loudspeaker and a keypad part. Depending on the type of the device, there may be different and a different number of user interface parts.

The electronic device of FIG. 1, such as a mobile station, also includes a memory 112 in which different applications operated on the electronic device 100 may be stored. In an embodiment, a navigation application 113 is stored in the memory 112 of the device. The electronic device 100 further comprises an acceleration sensor 114 for measuring horizontal orientation of the electronic device 100.

In an embodiment, the processing unit 102 is configured to set a horizontal condition required for the built-in compass. The horizontal condition indicates admissible values of horizontal orientation, i.e. tilt angle, of the electronic device 100. It is impossible to calculate a compass direction reliably if the electronic device 100 is not oriented correctly. The horizontal condition may include a given range of values of tilt angle of the electronic device 100 that are accepted in order to calculate the compass direction reliably enough.

The processing unit 102 is further configured to detect activation of the navigation application 113 on the basis of an input device, and to send a control command to the acceleration sensor 114 for measuring a tilt angle of the electronic device when activation of the navigation application 113 is detected. The processing unit 102 compares the measured tilt angle with the horizontal condition for the built-in compass and calculates a compass direction when, on the basis of the comparison, it is detected that the electronic device 100 meets the horizontal condition required by the built-in compass. Finally, the processing unit 102 is configured to indicate about compass direction being calculated by using the user interface 105.

Figure 2:
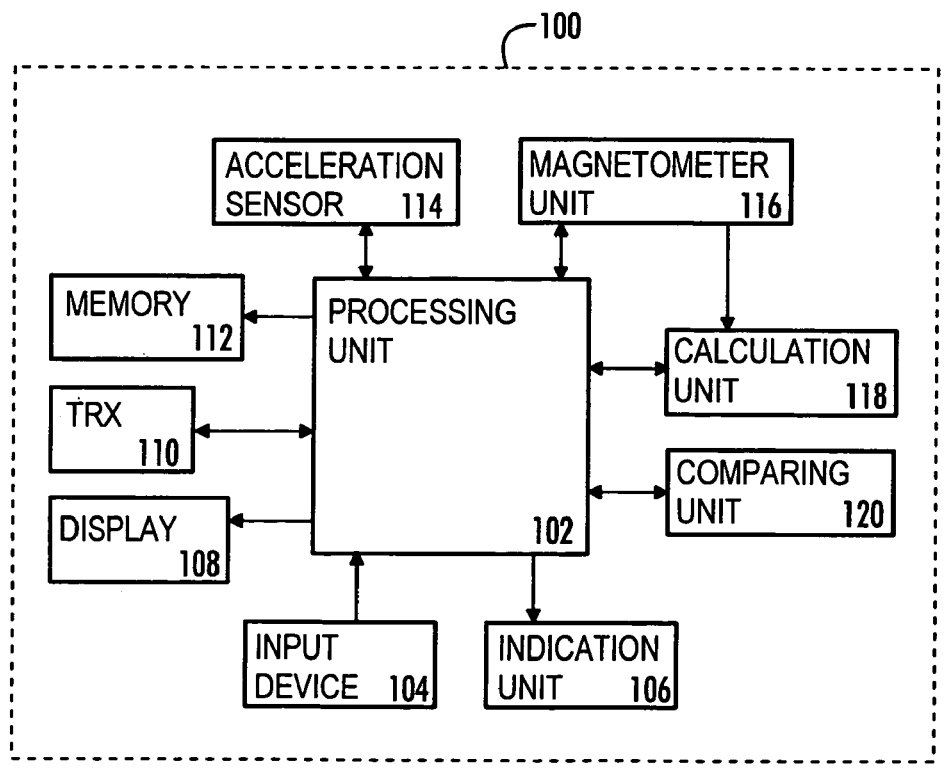
FIG. 2 illustrates another example of an electronic device.

FIG. 2 illustrates another example of an electronic device 100. The processing unit 102 controls the functions of the electronic device. The processing unit 102 receives control commands from an input device 104. The input device 104 is configured to give control commands for starting specific operations on the device or for loading given applications from a memory 112, for example.

The electronic device 100 may also include communication means 110 that implement the functions of a mobile station and include speech and channel coders, antennas, modulators and RF parts.

The electronic device 100 comprises an acceleration sensor 114 coupled to the processing unit 102 for measuring tilt angle of the electronic device 100, and a magnetometer unit 116 for detecting magnetism. Magnetometers are devices used to detect and measure the strength of magnetic fields. The electronic device 100 further comprises a calculation unit 118, a comparing unit 120, an indication unit 106, and a display 108.

In an embodiment, the processing unit 102 is configured to set a horizontal condition required for the built-in compass, the horizontal condition indicating admissible values of tilt angle of the electronic device, and to detect activation of a navigation application on the basis of the input device 104. The user of the device 102 may give control commands by using the input device 104 in several different ways. For example, it is possible that activation of the navigation application is detected on the basis of detected one or more selections of specific keys of a keypad of the input device 104. A dedicated key press may activate the navigation application of the device: in a "sleeping" key lock state, for example, pressing any key may activate the navigation application, and in an active mode a dedicated key press, for example, for a given period of time activates the navigation application. In an embodiment, activation of the navigation application is detected by a detected gesture input by the input device 102. Such a gesture input may be a tap or a shake directed to the electronic device 100, for example. Thus, the user of the device may, for example, shake or tap the device 100 in order to activate the navigation application.

In an embodiment, a key lock state may be activated in the device 100, and activation of the navigation application is also possible during the key lock state. Usually that a hiker or a runner has activated the key lock of the electronic device he/she is carrying while on the move. Thus, the user is not required to unactivate the key lock state in order to launch the navigation application. On the contrary, it becomes very easy to activate the navigation application even without a visual view to the device while on the move.

Next the processing unit 102 is configured to send a control command to the acceleration sensor 114 for measuring tilt angle of the electronic device when activation of the navigation application is detected. Information about the tilt angle of the device is then compared with the horizontal condition for the built-in compass in the comparing unit 120, for example. When, on the basis of the comparison, it is detected that the electronic device 100 meets the horizontal condition required by the built-in compass, the horizontal orientation information based on the measured tilt angle is sent to the magnetometer unit 116. In an embodiment, the horizontal information is updated in the magnetometer unit 116 only when the horizontal condition is met. The magnetometer unit 116 then measures magnetism only when the electronic device is in the correct horizontal orientation.

The processing unit 102 is configured to calculate a compass direction when, on the basis of the comparison, it is detected that the electronic device meets the horizontal condition required by the built-in compass. The compass direction may be calculated in the calculation unit 118 on the basis of the magnetism information measured in the magnetometer unit 116.

Finally, the processing unit 102 may give an indication about the calculated compass direction. The processing unit 102 indicate about the calculated compass direction, for example, by displaying the calculated compass direction on the display 108. A navigation application may show a map on the display 108, and after the compass direction has been calculated, the orientation of the map on the display 108 may be corrected to the current orientation with respect to the environment based on the calculated compass direction. Information about the calculated or updated compass direction can also be indicated with different sound alarms or lights. In an embodiment, the processing unit 102 indicates about the calculated compass direction by using a specific tactile feedback indication indicating to the user that the reading has been taken reliably. The tactile feedback indications may be generated by an indication unit 106. The tactile feedback may consist of one or more tactile feedback pulses or vibrations that can be felt by the user of the device.

Figure 3:
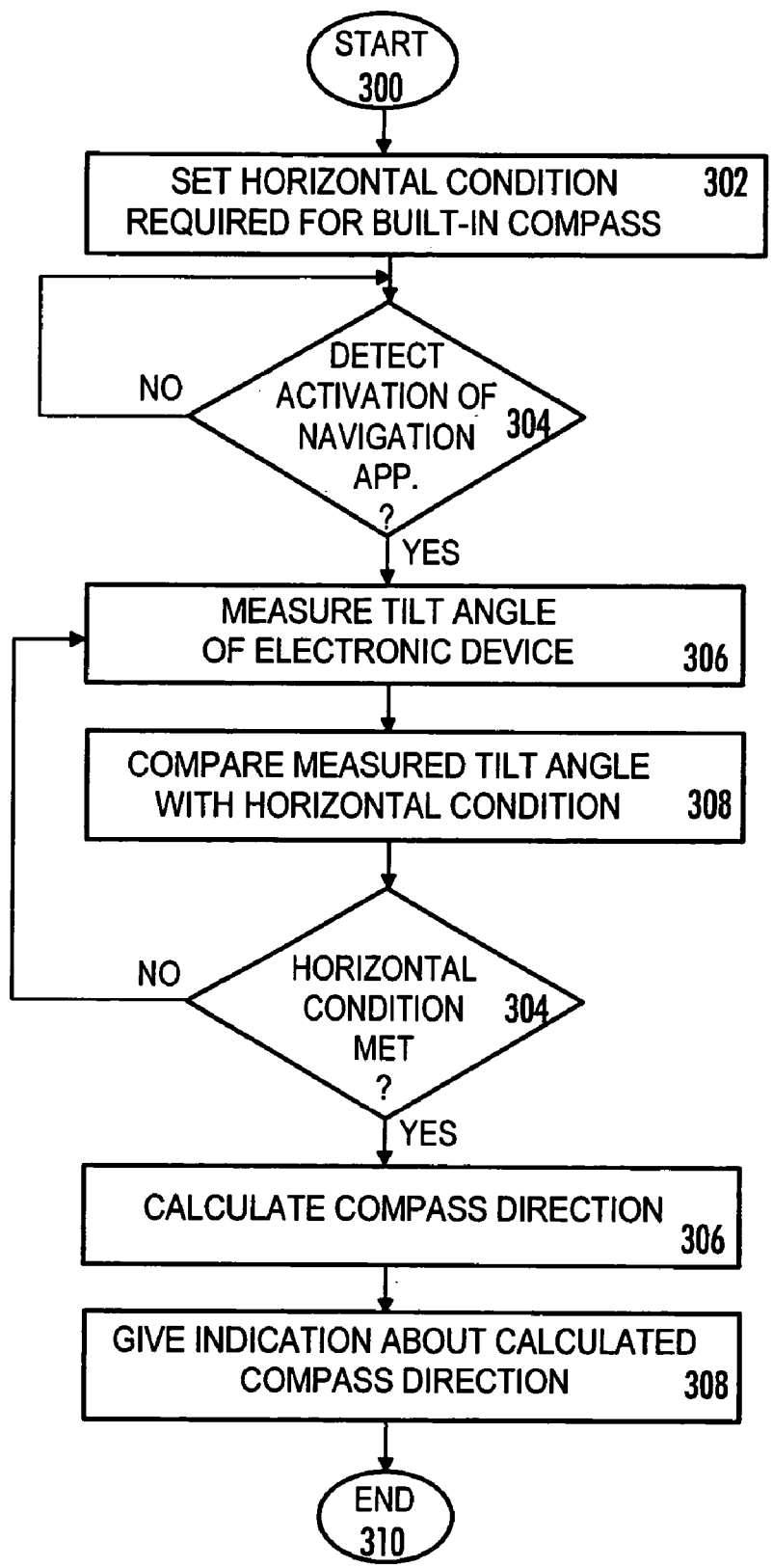
FIG. 3 illustrates an example of a method of operating a built-in compass of an electronic device.

FIG. 3 illustrates an example of a method of operating a built-in compass of an electronic device. The method starts in 300. In 302, a horizontal condition required for a built-in compass is set. It is possible that the horizontal condition is already set while manufacturing the device. It is also possible that the user may select the accuracy at which he/she wishes the compass direction to be calculated. Thus, the user of the device may himself/herself set the horizontal condition according to personal needs.

In 304, activation of a navigation application is detected. Different possibilities exist for activating the navigation application. The user of the device may, for example, select a specific method of activation he/she wishes to use in different situations. The user of the device may, for example, be running, and may have selected to use a very simple method, such as tap activation, for activating the navigation application. Other activation means the user may select include, for example, a dedicated key press, sensors, speech activation, or context based activation. Activation can be made every time the compass reading needs to be updated. It is also possible that once the activation of the navigation application has been made, it starts updating compass reading regularly.

If activation of the navigation application is detected, the process enters 306 where tilt angle of the electronic device is measured. Then, in 308, the measured tilt angle is compared with the set horizontal condition. If, in 304, the horizontal condition is met, i.e. the measured tilt angle is within the limits determined by the horizontal condition, the process enters 306. If, in 304, it is detected that the measured tilt angle is not stable enough for a magnetometer, e.g. within the limits determined by the horizontal condition, the process returns to 306 where the tilt angle is measured again.

In 306, the compass direction is calculated when, on the basis of the comparison, it is detected that the electronic device meets the horizontal condition required by the built-in compass. The measured and accepted tilt angle information is sent to a magnetometer unit where magnetism is measured. Next, the compass direction can be calculated on the basis of the measurement. Finally, in 308, an indication about the calculated compass direction is given. The indication may be tactile feedback for indicating about the calculated compass direction. The indication may also include displaying the calculated compass direction on a display of the electronic device. The method ends in 310.

From the viewpoint of the users of a device, the method and device offer an easy and reliable way of using a navigation application, such as an electronic compass. An electronic compass reading can also be updated very easily on the move and also in a key lock state of the device. The user can update the compass reading very easily without paying attention to the actual compass reading on the display of the device, and check new compass readings (directions as to where to go) separately from the actual compass reading. No visual attention is needed for realizing that the compass reading is available or that the device is kept in exactly the right horizontal orientation for getting reliable compass readings. The user can also easily repeat the procedure, and any time after an indication (e.g. vibra feedback) about the calculated compass reading see/check the display for the results.

Even though the invention has been described above with reference to an example according to the accompanying drawings, it is clear that the invention is not restricted thereto but it can be modified in several ways within the scope of the appended claims.

The invention claimed is:

1. A method of operating a built-in compass of an electronic device, the method comprising:
   setting a horizontal condition required for the built-in compass, the horizontal condition indicating admissible values of tilt angle of the electronic device;
   detecting activation of a navigation application on the basis of a gesture input of an input device;
   measuring a tilt angle of the electronic device when activation of the navigation application is detected;
   comparing the measured tilt angle with the horizontal condition for the built-in compass;
   calculating a compass direction when, on the basis of the comparison, it is detected that the electronic device meets the horizontal condition required by the built-in compass; and
   giving at least one of a tactile indication and an audible indication when the calculated compass direction is available.

2. The method of claim 1, the step of calculating the compass direction further comprising:
   sending an indication to a magnetometer unit for detecting magnetism when, on the basis of the comparison, it is detected that the electronic device meets the horizontal condition required by the built-in compass; and
   calculating a compass direction on the basis of magnetism values detected by the magnetometer unit.

3. The method of claim 1, the step of giving at least one of a tactile indication and an audible indication about the available calculated compass direction further comprising giving one or more tactile feedback pulses or one or more vibration signals.

4. The method of claim 1, the step of giving at least one of a tactile indication and an audible indication about the available calculated compass direction further comprising giving one or more sound alarms.

5. The method of claim 1, the step of detecting activation of the navigation application on the basis of the gesture input of an input device comprising detecting the gesture input of the input device on the basis of one or more taps or shakes or a combination thereof directed to the electronic device.

6. An electronic device having a built-in compass, the electronic device comprising:
   a processing unit for controlling functions of the electronic device;
   an input device coupled to the processing unit for giving control commands;
   an acceleration sensor coupled to the processing unit for measuring tilt angle of the electronic device;
   the processing unit is further configured to set a horizontal condition required for the built-in compass, the horizontal condition indicating admissible values of tilt angle of the electronic device, to detect activation of a navigation application on the basis of a gesture input of the input device, to send a control command to the acceleration sensor for measuring a tilt angle of the electronic device when activation of the navigation application is detected, to compare the measured tilt angle with the horizontal condition for the built-in compass, to calculate a compass direction when, on the basis of the comparison, it is detected that the electronic device meets the horizontal condition required by the built-in compass, and to give at least one of a tactile indication and an audible indication when the calculated compass direction is available.

7. The electronic device of claim 6, the electronic device further comprising a magnetometer unit coupled to the processing unit for detecting magnetism; and a calculation unit for calculating a compass direction on the basis of magnetism values detected by the magnetometer unit, wherein the processing unit is further configured to send an indication to the magnetometer unit for detecting magnetism when, on the basis of the comparison, it is detected that the electronic device meets the horizontal condition required by the built-in compass.

8. The electronic device of claim 6, the processing unit being further configured to give the at least one of a tactile indication and an audible indication about the available calculated compass direction by giving one or more tactile feedback pulses or one or more vibration signals.

9. The electronic device of claim 6, the processing unit being further configured to give the at least one of a tactile indication and an audible indication about the available calculated compass direction by giving one or more sound alarms.

10. The electronic device of claim 6, the processing unit being further configured to detect activation of the navigation application on the basis of the gesture input of the input device by detecting one or more taps or shakes, or a combination thereof directed to the electronic device.

11. A computer program product encoding a computer program of instructions for executing a computer process for operating a built-in compass of an electronic device, the process comprising:

setting a horizontal condition required for the built-in compass, the horizontal condition indicating admissible values of tilt angle of the electronic device;

detecting activation of a navigation application on the basis of a gesture input of an input device;

measuring a tilt angle of the electronic device when activation of the navigation application is detected;

comparing the measured tilt angle with the horizontal condition for the built-in compass;

calculating a compass direction when, on the basis of the comparison, it is detected that the electronic device meets the horizontal condition required by the built-in compass; and giving at least one of a tactile indication and an audible indication when the calculated compass direction is available.

12. An electronic device having a built-in compass, the electronic device comprising:

processing means for controlling functions of the electronic device; input means for giving control commands;

measuring means for measuring tilt angle of the electronic device;

setting means for setting a horizontal condition required for the built-in compass, the horizontal condition indicating admissible values of tilt angle of the electronic device;

detection means for detecting activation of a navigation application on the basis of a gesture input of the input means;

control means for sending a control command to measuring means for measuring a tilt angle of the electronic device when activation of the navigation application is detected;

comparing means for comparing the measured tilt angle with the horizontal condition for the built-in compass;

calculating means for calculating a compass direction when, on the basis of the comparison, it is detected that the electronic device meets the horizontal condition required by the built-in and compass;

indication means for giving at least one of a tactile indication and an audible indication when the calculated compass direction is available.

* * * * *